(12) United States Patent
Hobbs et al.

(10) Patent No.: US 9,397,944 B1
(45) Date of Patent: Jul. 19, 2016

(54) APPARATUS AND METHOD FOR DYNAMIC COMMUNICATION SCHEDULING OF VIRTUALIZED DEVICE TRAFFIC BASED ON CHANGING AVAILABLE BANDWIDTH

(71) Applicant: Teradici Corporation, Burnaby (CA)

(72) Inventors: David Victor Hobbs, Surrey (CA); Haw-Yuan Yang, Richmond (CA); Ian Cameron Main, Vancouver (CA)

(73) Assignee: Teradici Corporation, Burnaby, British Columbia (CA)

( * ) Notice: Subject to any disclaimer, the term of this patent is extended or adjusted under 35 U.S.C. 154(b) by 336 days.

(21) Appl. No.: 13/952,270

(22) Filed: Jul. 26, 2013

Related U.S. Application Data

(63) Continuation of application No. 11/864,637, filed on Sep. 28, 2007, now abandoned, which is a continuation-in-part of application No. 11/694,756, filed on Mar. 30, 2007, now abandoned.

(60) Provisional application No. 60/827,391, filed on Sep. 28, 2006, provisional application No. 60/744,078, filed on Mar. 31, 2006.

(51) Int. Cl.
*G06F 9/46* (2006.01)
*H04L 12/70* (2013.01)
*H04L 12/873* (2013.01)
*G06F 9/44* (2006.01)
*G06F 13/38* (2006.01)
*H04L 29/06* (2006.01)
*G06F 13/28* (2006.01)

(52) U.S. Cl.
CPC ............. *H04L 47/00* (2013.01); *G06F 13/387* (2013.01); *H04L 47/522* (2013.01); *G06F 9/4411* (2013.01); *G06F 13/28* (2013.01); *G06F 13/385* (2013.01); *H04L 29/06027* (2013.01)

(58) Field of Classification Search
None
See application file for complete search history.

(56) References Cited

U.S. PATENT DOCUMENTS 5,742,745 A   4/1998   Sugikawa et al.
6,148,354 A   11/2000  Ban et al.
(Continued)

OTHER PUBLICATIONS

"VMware Workload Management with AppSense Performance Manager", Whitepaper, AppSense Ltd, 3200 Daresbury Park, Daresbury, Warrington, WA4 4BU, United Kingdom, posted online Apr. 10, 2006 at: virtualization.info/en/news/2006/04/whitepaper-vmware-workload-management.html, 12 pgs.

(Continued)

*Primary Examiner* — Abu Ghaffari
(74) *Attorney, Agent, or Firm* — Moser Taboada

(57) ABSTRACT

In one embodiment a method for communicating data comprises receiving, by a traffic manager between a plurality of virtual machines (VMs) and a network interface, (a) first data from a first VM in the plurality of VMs and en route via a first client computer to a first device, and (b) second data from a second VM in the plurality of VMs and en route via a second client computer to a second device; determining first attributes of the first data that provide a first communication requirement; determining second attributes of the second data that provide a second communication requirement; determining, based on available bandwidth of the network interface, a communications schedule associated with cumulative bandwidth of the first and second communication requirements; and transmitting, according to the communications schedule, the first data to the first client computer and the second data to the second client computer.

20 Claims, 10 Drawing Sheets

(56) References Cited

U.S. PATENT DOCUMENTS

| | | | |
|---|---|---|---|
| 6,591,299 B2 * | 7/2003 | Riddle | H04L 29/06 370/230 |
| 6,934,945 B1 | 8/2005 | Ogilvy | |
| 7,182,646 B1 | 2/2007 | Chou et al. | |
| 7,186,147 B1 | 3/2007 | Chou et al. | |
| 7,191,440 B2 | 3/2007 | Cota-Robles et al. | |
| 7,287,257 B2 | 10/2007 | Meza | |
| 7,290,259 B2 | 10/2007 | Tanaka et al. | |
| 7,508,768 B2 * | 3/2009 | Yoon | H04L 43/026 370/224 |
| 7,532,642 B1 * | 5/2009 | Peacock | H04L 43/0864 370/252 |
| 7,908,335 B1 | 3/2011 | Citterelle et al. | |
| 7,934,006 B2 | 4/2011 | Kato et al. | |
| 8,028,040 B1 | 9/2011 | Hobbs et al. | |
| 8,209,682 B2 | 6/2012 | Cherkasova et al. | |
| 8,488,451 B2 * | 7/2013 | Wollmershauser | H04L 12/2856 370/230 |
| 2002/0101515 A1 | 8/2002 | Yoshida et al. | |
| 2002/0140851 A1 | 10/2002 | Lasono | |
| 2002/0143842 A1 | 10/2002 | Cota-Robles et al. | |
| 2002/0174206 A1 | 11/2002 | Moyer et al. | |
| 2003/0033441 A1 | 2/2003 | Forin et al. | |
| 2003/0208340 A1 | 11/2003 | Dorough | |
| 2003/0212841 A1 | 11/2003 | Lin | |
| 2004/0203296 A1 | 10/2004 | Moreton et al. | |
| 2004/0212730 A1 | 10/2004 | MacInnis et al. | |
| 2005/0060421 A1 | 3/2005 | Musunuri et al. | |
| 2005/0160212 A1 * | 7/2005 | Caruk | G06F 13/40 710/301 |
| 2005/0240685 A1 | 10/2005 | Keys | |
| 2006/0036877 A1 * | 2/2006 | Anderson | G06F 1/3209 713/300 |
| 2006/0089992 A1 | 4/2006 | Blaho | |
| 2006/0123166 A1 | 6/2006 | Toebes et al. | |
| 2007/0209035 A1 | 9/2007 | Sonderegger et al. | |
| 2008/0140811 A1 | 6/2008 | Welch | |
| 2009/0024746 A1 | 1/2009 | Welch | |
| 2012/0059937 A1 * | 3/2012 | Dheap | H04L 47/10 709/226 |

OTHER PUBLICATIONS

"The Business of N-Port Virtualization", Emulex Corporation, 3333 Susan Street, Costa Mesa, CA 92626, USA, Sep. 2005, 4 pgs.

Hirofuchi et al., "USB/IP: A Transparent Device Sharing Technology over IP Network", Apr. 2005, USENIX Association, pp. 47-60.

* cited by examiner

APPARATUS AND METHOD FOR DYNAMIC COMMUNICATION SCHEDULING OF VIRTUALIZED DEVICE TRAFFIC BASED ON CHANGING AVAILABLE BANDWIDTH

CROSS-REFERENCE TO RELATED APPLICATIONS

This application is a continuation of pending U.S. non-provisional patent application Ser. No. 11/864,637 filed Sep. 28, 2007, which (i) further claims benefit of U.S. Provisional Patent Application Ser. No. 60/827,391, filed Sep. 28, 2006, entitled "Methods and Apparatus for Virtualizing Multiple Serial Bus Interfaces" which is herein incorporated by reference in its entirety, and (ii) also is a continuation in part of U.S. patent application Ser. No. 11/694,756 entitled "Selective Routing of Peripheral Device Signals" filed on Mar. 30, 2007, which is also incorporated herein by reference in its entirety and claims priority to U.S. Provisional Patent Application Ser. No. 60/744,078, entitled "Methods and Apparatus for Selective Routing of Peripheral Device Signals," filed Mar. 31, 2006, which is also incorporated herein by reference in its entirety. Each of the aforementioned related patent applications is herein incorporated by reference in its entirety.

FIELD OF THE INVENTION

The present invention relates broadly to peripheral device communication methods. More specifically, the present invention describes methods and apparatus for managing the communications of peripheral device information between peripheral devices connected to client computers and virtualized software environments in a host computer elsewhere on a network.

BACKGROUND OF THE INVENTION

Historic advances in computer technology have made it economical for individual users to have their own computing system, which caused the proliferation of the Personal Computer (PC). Continued advances have made these personal computers powerful but difficult to manage. For this and other reasons there is a desire in many workplace environments to separate the peripheral devices associated with the user interface, including keyboard, mouse, audio, display and other peripheral devices from the storage and application processing parts of the computing system. In this configuration, the user interface devices are physically located at the desktop, while the processing and storage components are incorporated in a host computer system placed in a central location. The peripheral devices are then connected to the host computer system by some method of communication. Additional economies of scale may be gained by enabling a host computer system to simultaneously host multiple isolated remote user environments or "virtual machines", each with its own application software, operating system, memory resources and network connection using software virtualization technologies such as XEN, VMWARE™ or others.

Virtualized host computer systems that enable remote access comprise software drivers such as VNC, CITRIX ICA®, or Remote Desktop Protocol (RDP) drivers within each virtual machine used to bridge user interface signals to a remotely located client computer. A challenge with these highly abstracted bridges arises in their inability to support a diversity of peripheral devices connected to a client computer because the abstraction prevents the tight coupling between the device and a device driver required for many types of devices. Furthermore, remotely located device drivers increase the maintenance burden and introduce interoperability risks caused by mismatching driver versions and peripheral devices. A second approach used for remote access locates the device drivers and application software in one computer while the bus drivers and peripheral devices are associated with another computer elsewhere on a network. USB-over-IP methods such as AnywhereUSB bridge the connection between the bus controller driver and device driver layers of the two computers.

In a related field, virtualized servers connect to virtualization storage networks and databases using Host Bus Adapters (HBAs) provided by vendors such as EMULEX Ltd. An HBA manages storage system transactions and supports flow control of workloads flowing through the shared physical adapter for predictable response times and QoS but is not suited to peripheral device communications.

In view of the poor compatibility of these connection systems and techniques, there is a need in the art for a system and methods for providing connections between a virtualized host computer and remote peripheral devices.

SUMMARY OF THE INVENTION

Embodiments of the present invention generally relate to communicating media data substantially as shown in and/or described in connection with at least one of the figures. In one embodiment, a method for communicating data comprises receiving data from a VM, en route from a first client computer to a peripheral device and determining device dependent attributes of the data comprising communication requirements. A communications schedule is then determined associated with a cumulative bandwidth of the communications requires and the data is transmitted according to the schedule.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

In the following detailed description of the present invention, apparatus and methods from managing virtualized device traffic, numerous specific details are set forth to provide a more thorough description of embodiments of the invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Figure 1:
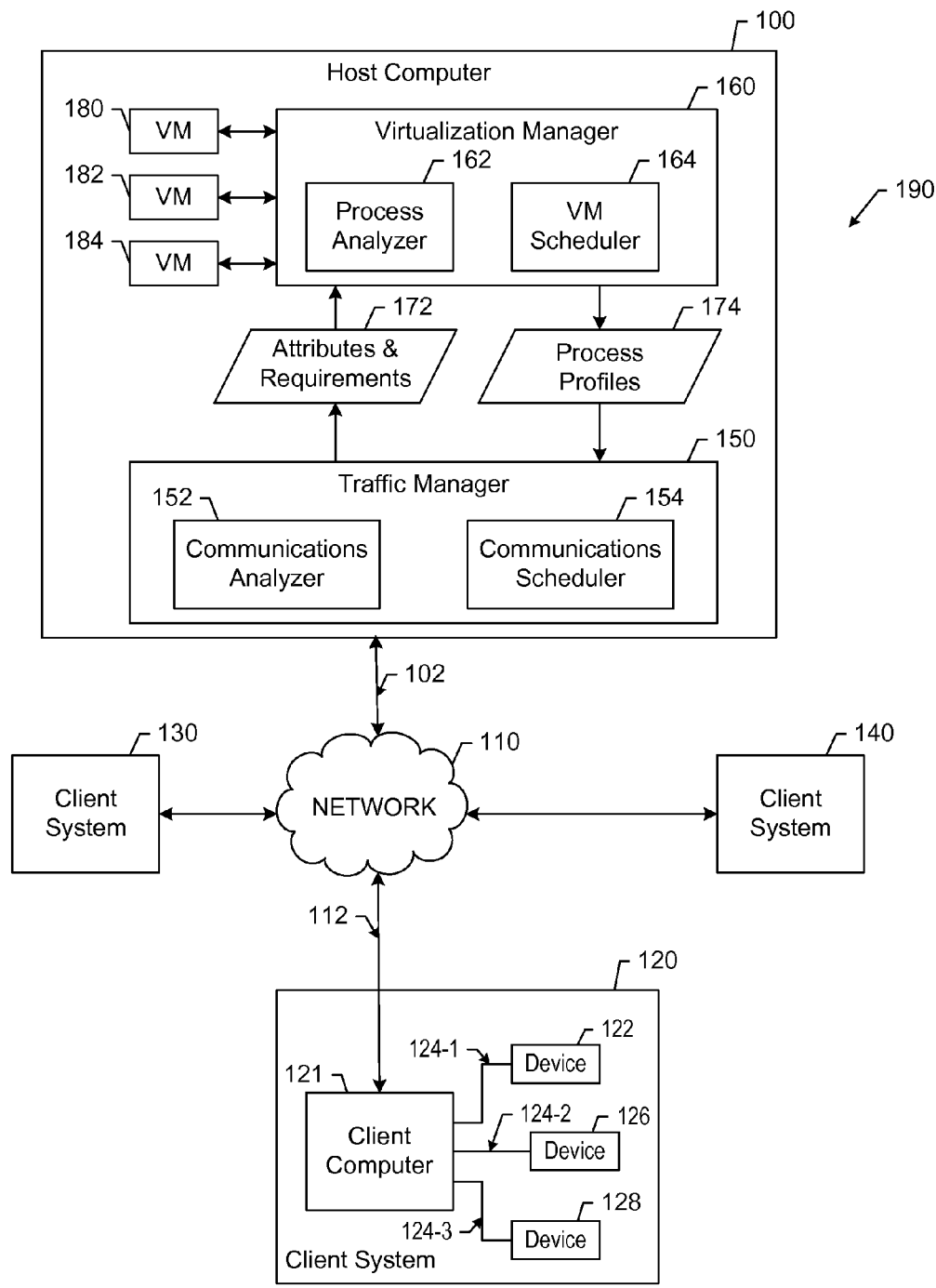
FIG. 1 illustrates an embodiment of a system comprising a host computer with virtualization- and traffic managers in communications with a plurality of client computers and associated peripheral devices.

FIG. 1 shows an embodiment of system 190 that provides communications between host computer 100 and one or more peripheral devices connected to multiple client computers (alternatively referenced as 'remote computers') at different locations on a network. Host computer 100 connects to network 110 by network connection 102. An embodiment of computer 100 is described in FIG. 2. Network 110 is a reliable network such as an IP-based Local Area Network (LAN), for example as deployed in a corporate environment, a Wide Area Network (WAN), for example as deployed between an application service provider such as an Internet Service Provider (ISP) and a set of residential application users or the like.

Client system 120 is connected to network 110 by network connection 112. Connection 112 is an IP connection such as an Ethernet, wireless, cable, Digital Subscriber Line (DSL) connection or the like. In an exemplary embodiment system 120 provides a computer interface for a remote user, including providing a Graphic User Interface (GUI) display function and a connection point for peripheral devices.

Peripheral device 122 is connected to client computer 121 by peripheral bus 124 wherein bus 124 is a wired or wireless Universal Serial Bus (USB), Firewire™, Bluetooth® bus or the like. Peripheral device 122 is a computer peripheral device such as a keyboard, mouse, speaker set, microphone, webcam, memory stick, biometric device, printer, scanner or the like.

Computer 121 is also connected to peripheral devices 126 and 128. Devices 126 and 128 are other computer peripheral devices such as those listed above. In some embodiments, devices 126 and 128 are connected to computer 121 by a peripheral bus substantially similar to bus 124. For example, in an embodiment, devices 122, 126 and 128 are all USB devices connected to a root USB hub in computer 121. In other embodiments, devices 122, 126 and 128 are connected by different buses such as a wired USB, wireless USB and Firewire buses.

Client systems 130 and 140 are also connected to network 110 and are also in communication with host computer 100. Each of these client systems also has a set of one or more peripheral devices, for example as typical of a computer user interface. Client systems 130 and 140 may comprise similar or different devices to system 120.

Host computer 100 comprises traffic manager 150 with analyzer 152 to analyze ingress and egress data structures associated with peripheral device communications.

In one embodiment, traffic manager 150 analyzes ingress data structures and generates device dependent attributes 172 used by process analyzer 162 and virtual machine scheduler 164 of virtualization manager 160 to schedule virtual machines 180, 182 and/or 184 of computer 100 according to the processing requirements of the ingress data.

In another embodiment, traffic manager 150 analyzes egress data structures and generates device dependent attributes 172 associated with future process scheduling requirements used by process analyzer 162 and virtual machine scheduler 164 to schedule virtual machines 180, 182 and/or 184 of computer 100 for future processing, for example by providing a virtual machine associated with isochronous communications with a periodic schedule.

In another embodiment, communications scheduler 154 of traffic manager 150 uses process profiles 174 to schedule device communications according to peripheral device communication attributes and the process profile of the associated client system and peripheral device.

System 190 is one exemplary embodiment of a host computer. Other embodiments of system 190 comprise a different number of client systems connected to network 110 and some embodiments of computer 100 comprise a different number of virtual machines.

Figure 2:
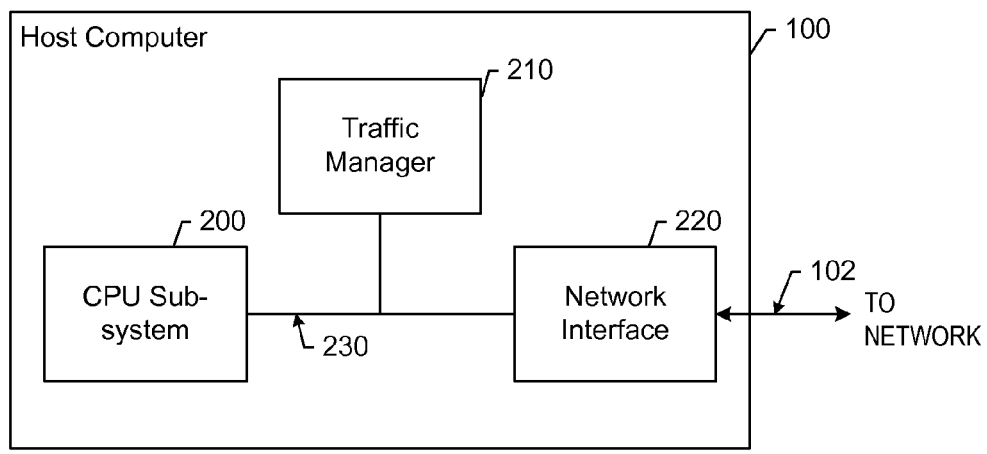
FIG. 2 illustrates a host computer system comprising CPU sub-system, traffic manager and network interface.

FIG. 2 illustrates a structural embodiment of host computer 100 in FIG. 1, showing structures related to process scheduling, traffic management and communications with client peripheral devices. It will be appreciated by those of ordinary skill in the art that other components including power supplies, storage elements, local peripheral device interfaces, status indicators, enclosure and the like are excluded from FIG. 2 so as not to obscure inventive aspects of the present specification.

CPU sub-system 200 is connected to traffic manager 150 and network interface 220 by system interconnect 230. Interconnect 230 is, for example but not limited to, one or more buses such as a Peripheral Component Interconnect (PCI) bus, a PCI-Express™ bus, a HyperTransport™ bus, an Advanced Microprocessor Bus Architecture (AMBA®) bus or other wired connections, as is known in the art. Interconnect 230 has additional elements, such as controllers, data buffers, drivers, repeaters, and receivers, to enable communications but omitted from FIG. 2 for clarity. Further, interconnect 230 includes address, control, interrupt and/or data connections to enable appropriate communications among the aforementioned components.

CPU sub-system 200 hosts virtualization software, operating systems, peripheral device drivers and other software such as user application software. Sub-system 200 also comprises memory resources needed to store program code and data such as audio data, Human Interface Device (HID) event data, files or other data related to peripheral devices. An embodiment of sub-system 200 is illustrated in FIG. 3.

Figure 5:
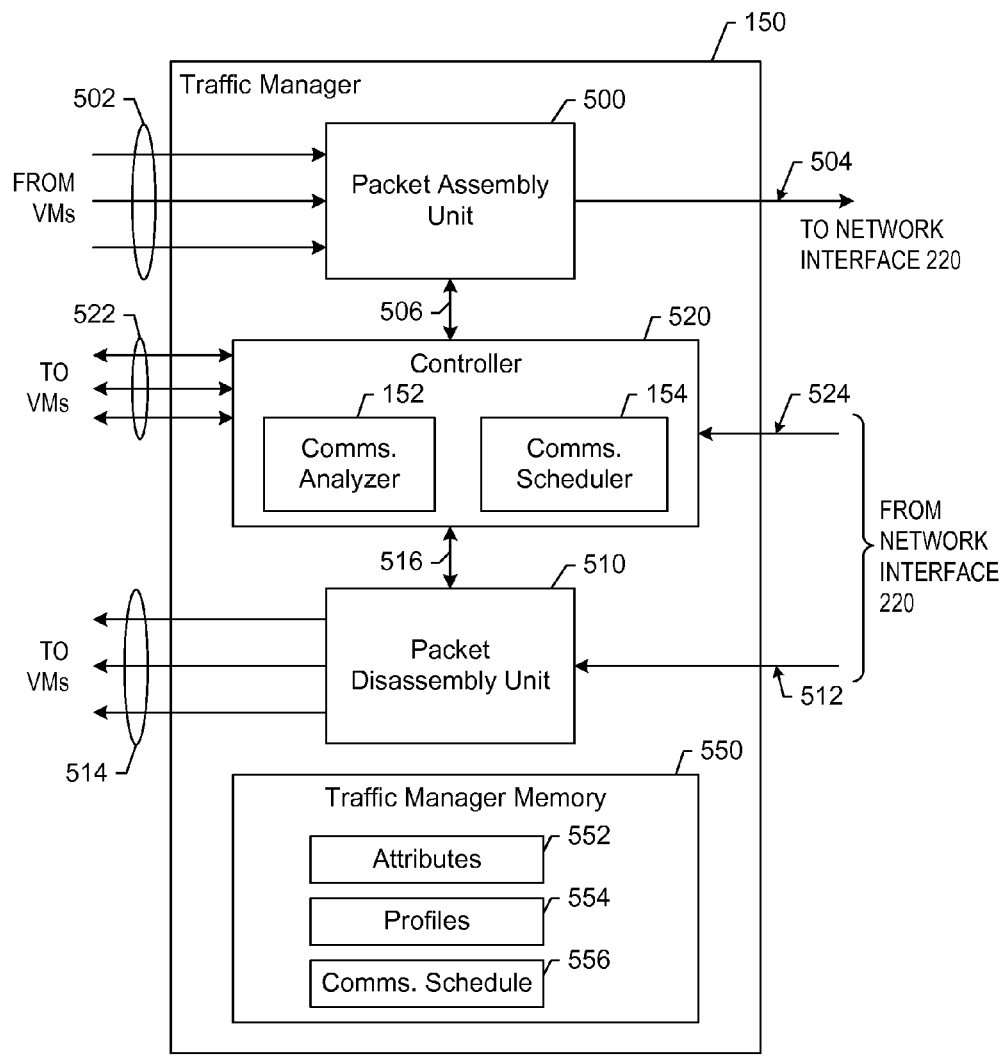
FIG. 5 illustrates an embodiment of a traffic manager comprising packet assembly and packet disassembly units.

Traffic manager 150 manages the transfer of data related to peripheral devices between sub-system 200 and client computers such as client systems 120, 130 and 140 in FIG. 1. In an embodiment, traffic manager 150 is an independent logic circuit for example as implemented in an Application Specific Integrated Circuit (ASIC) or Field Programmable Gate Array (FPGA), connected to interconnect 230. In other embodiments, part or all of traffic manager 150 is integrated in sub-system 200 or network interface 220. In another embodiment, elements of traffic manager 200 are software functions executed by sub-system 200. An independent modular embodiment of traffic manager 150 is illustrated in FIG. 5.

Network interface 220 communicates peripheral device data such as USB Request Blocks (URBs) or other device-related data, commands or responses between traffic manager 150 and the aforementioned client computers. In an embodiment, interface 220 provides compatibility with network 110 in FIG. 1 by executing a reliable protocol stack such as TCP/IP. In the embodiment illustrated in FIG. 2, network interface 220 is an independent processing function connected to interconnect 230. In addition to supporting peripheral device data between interface 220 and traffic manager 150, interconnect 230 provides information relating to network status such as network capacity, availability information or queue fill levels associated with the network interface. In one embodiment, interface 220 is tightly coupled with sub-system 200, for example using an independent bus. In another embodiment interface 220 is tightly coupled with traffic manager 150 and another network interface is available to sub-system 200 for other communications.

Figure 3:
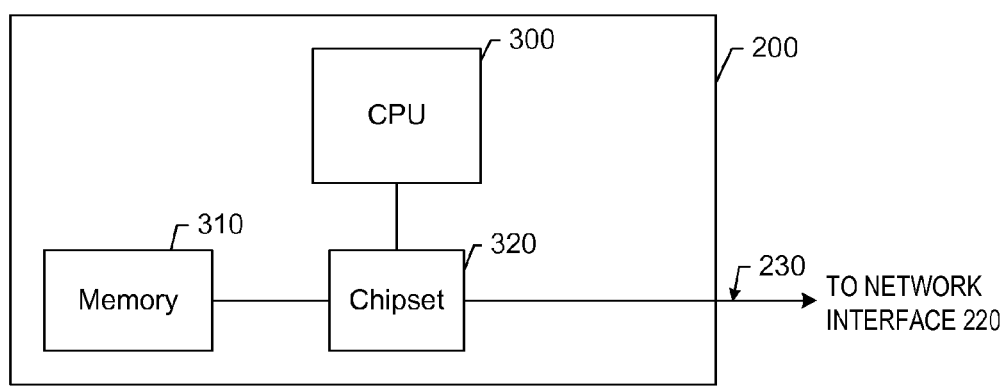
FIG. 3 illustrates an embodiment of a CPU sub-system.

FIG. 3 illustrates an embodiment of CPU sub-system 200 in FIG. 2. Sub-system 200 comprises CPU 300 connected to memory 310 by chipset 320. Examples of CPU 300 include 32-bit, 64-bit or other CPUs such as an AMD Opteron or Intel Xeon processor. In some embodiments, CPU 300 is a multi-core processor. In other embodiments, CPU 300 comprises multiple CPUs connected by a communications fabric such as HyperTransport, Infiniband™ or PCI-Express. Chipset 320 includes a memory interface such as a typical north bridge interface to memory 310 and a system bus interface for interconnect 230. In some embodiments, CPU 300 and/or chipset 320 further incorporate hardware-based virtualization management features such as emulated register sets, address translation tables, interrupt tables, PCI I/O virtualization (IOV) and I/O memory management unit (IOMMU) to enable DMA operations from traffic manager 150 in FIG. 2 to protected areas of memory 310.

In an embodiment, memory 310 comprises any one or combination of volatile computer readable media (e.g., RAM such as DRAM, SRAM, etc.) and nonvolatile computer readable media (e.g., ROM, hard drive, tape, CDROM, DVDROM, magneto-optical disks, EPROM, EEPROM, Flash EPROM etc.). Moreover, in some embodiments, memory 310 incorporates electronic, magnetic, optical, and/or other types of storage media known to the art. In some embodiments, memory 310 is globally distributed, for example some memory may be connected to interconnect 230.

Figure 4:
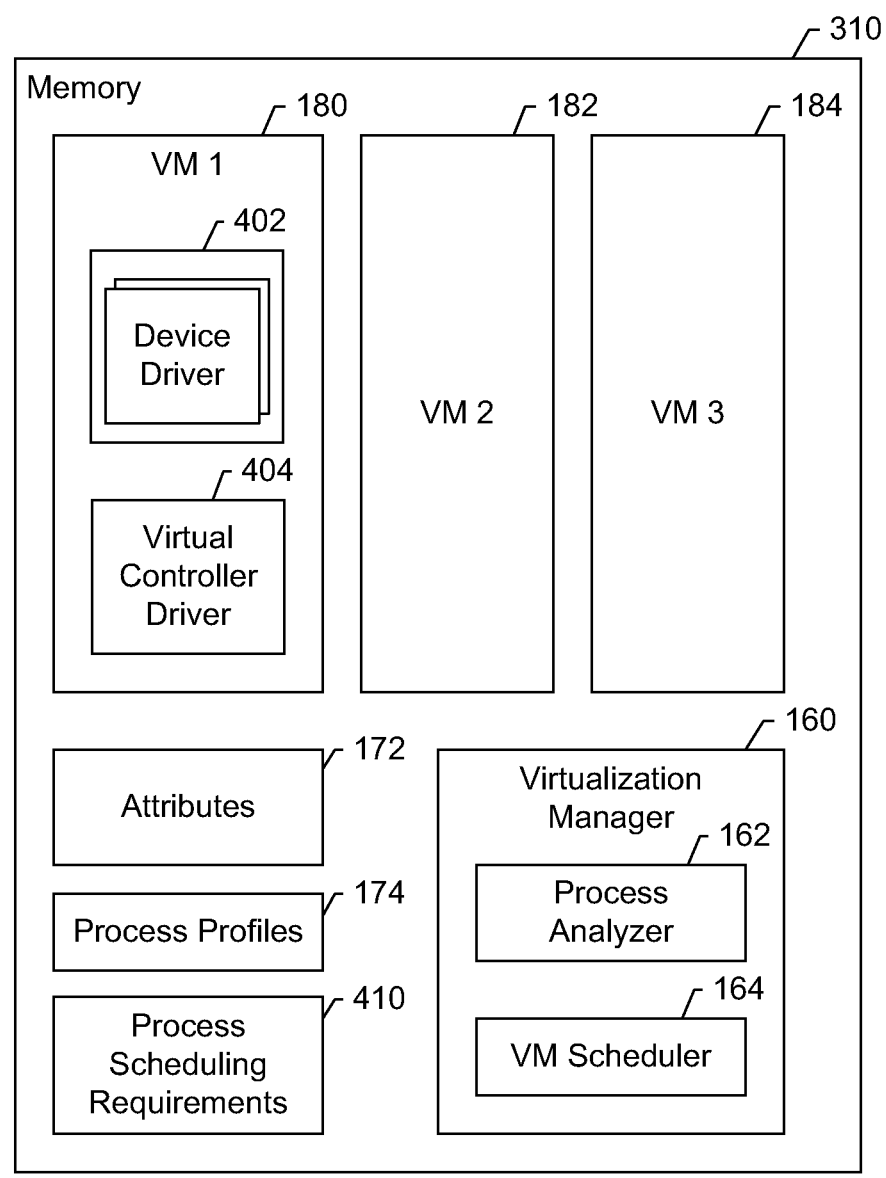
FIG. 4 illustrates a host memory comprising virtualization software and data structures.

FIG. 4 is a block diagram representing an exemplary embodiment of various software elements stored in memory 310 (ref. FIG. 3) of host computer 100 in accordance with one or more embodiments of the present invention.

The software and data structures in memory 310 are associated with a virtualized software environment. Virtualization manager 160 manages virtual machines 180, 182 and 184. In some embodiments, virtual machines are referenced as Operating System (O/S) domains. In general terms, a virtual machine comprises an interdependent set of processes (herein referred to as 'a process') scheduled by virtual machine scheduler 164. Each VM is an autonomous O/S environment with one or more applications and related drivers. In some embodiments such as a Xen paravirtualization environment, an Input/Output (I/O) VM is present to host I/O-related device drivers. In such embodiments, other "guest" VMs are host to paravirtual drivers that communicates indirectly with devices using the device drivers in the I/O VM. In an exemplary embodiment, each VM comprises an operating system such as a Windows operating system from Microsoft, Inc. for example Windows® XP or Windows VISTA™, a LINUX® operating system available from many vendors or a UNIX® operating system, also available from many vendors including Hewlett-Packard, Inc. or Sun Microsystems, Inc.

In the exemplary embodiment of FIG. 4, each VM is associated with a different client system and comprises a set of drivers associated with the peripheral devices attached to the computer of the client system. For example, in an embodiment, VM 180 is associated with client system 120, VM 182 is associated with system 130 and VM 184 is associated with system 140, all shown in FIG. 1. VM 180 comprises device drivers 402 and virtual controller driver 404 in addition to well known software such as operating system and application software known to the art. VMs 182 and 184 comprise similar software components. Device drivers 402 typically comprise a human interface device (HID) driver to support termination of mouse and keyboard in addition to a selection of other standard device drivers (alternatively referenced as class drivers) such as mass storage, audio, video, printer, serial or other device drivers depending on the diversity of supported peripheral devices. In an exemplary USB embodiment, drivers 402 comprise a set of set of USB device drivers; each associated with a peripheral device such as one device driver associated with each of the devices 122, 126 and 128 in FIG. 1.

Virtual controller driver 404 manages communications between device drivers 402 and a client computer by communicating with traffic manager 150 in FIG. 1, for example writing data, reading data and responding to interrupts from the traffic manager. In an exemplary USB embodiment, driver 404 services URB commands from USB device drivers by writing the URBs to traffic manager 150 and returning URB responses to the USB device drivers, services Plug and Play requests from a Plug and Play manager, enumerates devices that are plugged in and performs bus-level power management for the USB connections associated with the VM. In some USB embodiments, driver 404 also performs URB translation between host and remote OS environments such as translation between Windows and Linux environments.

Virtualization manager 160 (alternatively referred to as a Hypervisor) manages the operation of VM 180, VM 182, VM 184 (and other virtual machines if present). Examples of commercially available virtualization management products include VMWare ESX Server from EMC Corporation, Xen-Server from XenSource™ or virtualization products from Microsoft Corporation such as Microsoft Virtual Server or Viridian.

Process analyzer 162 generates process scheduling requirements 410 according to peripheral device dependent attributes 172, process profiles 174 and additional virtualization manager criteria comprising virtual machine resource allocation, interrupt priorities, file system transfer state, network communication state such as bandwidth availability, the state the other virtual machines, resource usage statistics and the like. In an embodiment, a process scheduling requirement is a process throughput requirement such as a pre-determined number of CPU cycles allocated servicing one or more ingress data structures, a process timing requirement such as a determined process frequency and duration (alternatively termed a 'process periodicity') or a process duration requirement.

In an embodiment, device dependent attributes 172 comprise information retrieved from data structures useful in determining process scheduling requirements. For example, transfer type, device type, device identification information or data size are suitable device dependent attributes. In an exemplary USB embodiment, transfer type is classified as one of isochronous, interrupt, bulk data or control types. Other media data transfer types such as streaming media types are also contemplated. Device identification information includes information such as device serial number, class ID, target bus controller ID information or other identification information in a device descriptor. In some embodiments, packet size information associated with an URB data structure or event information (for example high priority USB HID events such as mouse button presses or keyboard entries) is used to determine process scheduling requirements. In an exemplary embodiment, the VM process duration is set in proportion to the data size. In another embodiment, a VM process is delayed until the data size reaches a determined threshold so that multiple data structures can be processed as a batch. In some embodiments, attributes 172 further comprise servicing requirements from traffic manager 150, for example scheduling based on queue fill level, interrupt status or transaction completion status.

In an embodiment, process profiles 174 comprise priority requirements associated with client systems or devices such as user or device priority requirements. For example, HID device data demands high priority servicing, isochronous data or other media data associated with a device such as a USB microphone requires periodic servicing and bulk data transfers associated with a device such as a mass storage device typically has a lower priority servicing requirement. In an embodiment, bulk data transfers associated with different client systems or devices have different communication priorities.

VM Scheduler 164 schedules the virtual machines based in part on scheduling requirements 410 determined by attributes 172 received from traffic manager 150 in FIG. 1. In an embodiment, scheduler 164 evaluates the scheduling requirements and adjusts the schedule of one or more VMs accordingly, for example by running the VM immediately, running the VM for a determined duration, running the VM at a determined frequency, delaying the VM until additional data is available for processing or delaying the VM until a predetermined time limit has been reached.

It will be appreciated by those of ordinary skill in the art that virtualization manager 160 further comprises other functions such as an address manager, virtual machine monitors, distributed VM file system, network stack, virtual network interface, storage stack, device drivers and hardware interface drivers omitted from FIG. 4 for clarity. The address manager presents each virtual controller driver (ref. driver 404) with a virtualized PCI address space mapped to a physical address space used by traffic manager 150 (FIG. 1). Data and interrupts are then directed between traffic manager 150 and the designated VM, for example using translation tables and memory management units resident in the hardware domain.

In a USB embodiment, peripheral device information compiled as URBs or control data such as transfer status signals and DMA control signals is translated and communicated to traffic manager 150. USB attachment events are typically handled inside the VM domain. When a USB device is plugged or unplugged, the virtual controller driver uses the plug and play (PnP) interface in the VM to inform the PnP manager in the VM of the event.

FIG. 5 illustrates an embodiment of traffic manager 150 in FIG. 1 showing processing elements, memory structures and logical connections to external components; the logical connections defining data and signaling relationships between elements. Physical data and signaling events such as interrupts are communicated using one or more bus interconnects previously described, such as interconnect 230 in FIG. 2.

Traffic manager 150 comprises controller 520 for determining device dependent attributes 552 and a communications schedule 556. Traffic manager 150 further comprises Packet Assembly Unit (PAU) 500 tasked with managing the flow of egress peripheral device information from sub-system 200 to network interface 220 (both in FIG. 2) and Packet Disassembly Unit (PDU) 510 for managing the flow of ingress peripheral device information data from network interface 220 to sub-system 200.

Controller 520 comprises analyzer 152 that analyzes ingress and egress data structures for device dependent attributes 552. In an embodiment, attributes 552 are stored in memory 550 for use in determining communications timing requirements. Attributes are also forwarded to virtualization manager 162 in FIG. 1 as attributes 172 in FIG. 1 previously described.

Controller 520 generates communications schedule 556 based on the communication timing requirements associated with attributes 552 and process profiles 554 received from virtualization manager 160 in FIG. 1. In an embodiment, profiles 554 are a local copy of profiles 174 in FIG. 1 comprising client system and device profiles for system 190 in FIG. 1 previously described.

Controller 520 compares data attributes such as URB types from different VMs and determines servicing requirements based on the type of peripheral device information forwarded to virtualization manager 162 (FIG. 1), for example in conjunction with attributes 172 (FIG. 1). In one exemplary instance, a queue containing an URB related to an HID device associated with one VM receives a higher service priority weighting than a queue with an URB related to a bulk memory device associated with a different VM. In an embodiment, servicing requirements are continually updated and maintained as part of attributes 552 used by process analyzer 162 in FIG. 1.

Packet assembly, disassembly and transmission operations are then scheduled by communications scheduler 154 according to communications schedule 556.

In one or more embodiments, controller 520 also monitors transfer and network status, buffer queue depth, events associated with peripheral devices, hosts DMA controllers and performs other traffic management operations. In some embodiments, DMA resources are located in the PAU and PDU units. Controller 520 communicates interrupts, control and status information with the VMs using logical control signal set 522 where for example one logical connection of signal set 522 is associated with each of VMs 180, 182 and 184 in FIG. 1.

In some embodiments, controller 520 receives network status information such as bandwidth availability, error statistics, transmission latency or other network-related information over logical network status connection 524 from network interface 220 in FIG. 2. Network status information is used to adjust communications schedule 556 and queue threshold levels according to network loading. For example, in an embodiment, data in egress queues is delayed in the presence of limited bandwidth availability or high error levels. In another embodiment, data at lower priorities such as data associated with a bulk transfer is delayed but data associated with higher priority transfers such as control data is transmitted at the specified priority until network conditions return to normal.

In an embodiment, controller 520 monitors URB transfer status and control messages, including DMA completion signals and memory-based status structures such as URB completion status. In some embodiments, controller 520 tracks other information including transfer error status and interrupts the VMs with status updates and DMA completion messages. In one embodiment, controller 520 monitors the levels of egress buffer queues and submits backpressure messages to the VM domain, for example by interrupting the virtual controller driver associated with a problematic queue in case of network congestion, URB queue congestion, underflow associated with an isochronous stream or lack of DMA resources.

In other embodiments, controller 520 maintains a transfer status list, for example using memory 550. The transfer status list records incomplete transactions so that transaction signaling can be accelerated by prioritizing data structures associated with an incomplete transaction. As one example, controller 520 tracks the status of multi-stage transactions that benefit from prioritized responses. For example, USB device drivers segment some egress data transfers into multiple stages, wherein each stage requires a completion sequence before the next stage commences. In such cases, controller 520 determines the progress of such staged transfers by recognizing URB types in the egress queues. The transfer is recorded in the transfer status list so that responses and commands associated with later stages are prioritized by ingress and egress schedulers. One example of such a staged USB transfer is a DVD write transaction.

Controller 520 also comprises DMA resources including DMA controllers and scheduling logic used by PAU 500 and PDU 510. In an embodiment, DMA controllers are statically assigned to VMs when they are instantiated. In other embodiments, a common pool of DMA resources is allocated to the PAU and PDU on a demand-driven basis. In some embodiments, DMA controller resources make use of a virtual I/O translation and security functions provided by I/O MMU services of the CPU sub-system to facilitate address translation and security of physical memory, typically under administration of a virtualization manager.

In an embodiments, controller 520 supports driver-initiated communications schedule updates, for example as provided on a per-URB basis or according to user priority information in a process profile, for example as provided by an administrative service console. In another embodiment, controller 520 provides a means for driver-initiated flushing of ingress or egress queues, for example in the case when a USB unplug event is detected.

In an exemplary USB embodiment, PAU 500 receives device dependent data structures such as USB URBs, block data or control messages as logical signal set 502 from the VM domains associated with the system, for example one logical connection from signal set 502 associated with each of VMs 180, 182 and 184 in FIG. 1. URB data structures are written by any of the virtual controller drivers to traffic manager 150 while data blocks associated with URBs are embedded in the URBs or transmitted separately, for example sent by a DMA resource associated with the controller driver or read by the PAU under IOMMU management. PAU 500 operates in conjunction with analyzer 152 to inspect egress data such as egress URBs to extract device dependent attributes 552 useful in determining communication timing requirements or process scheduling requirements. In one embodiment, header information in the egress data structures is evaluated by analyzer 152 for information such as transfer type, device type, device identification information or data size useful in determining the aforementioned requirement during the packet assembly process. While transfer type is established based on an analysis of URB header information, device type and device identification information is gleaned from an analysis of device and configuration descriptor information exchanged between the peripheral device and host computer during enumeration. In an embodiment, traffic manager 150 stores device descriptor information and associated logical communication channel identification information to identify subsequent related communications between the host and client computers. PAU 500 queues the data, for example using priority queues suitable for supporting scheduled network packet encapsulation and transmission according to communication schedule 556. The egress data structures are then transmitted to network interface 220 (FIG. 2) over logical connection 504. A USB embodiment of PAU 500 is illustrated in FIG. 6.

Figure 7:
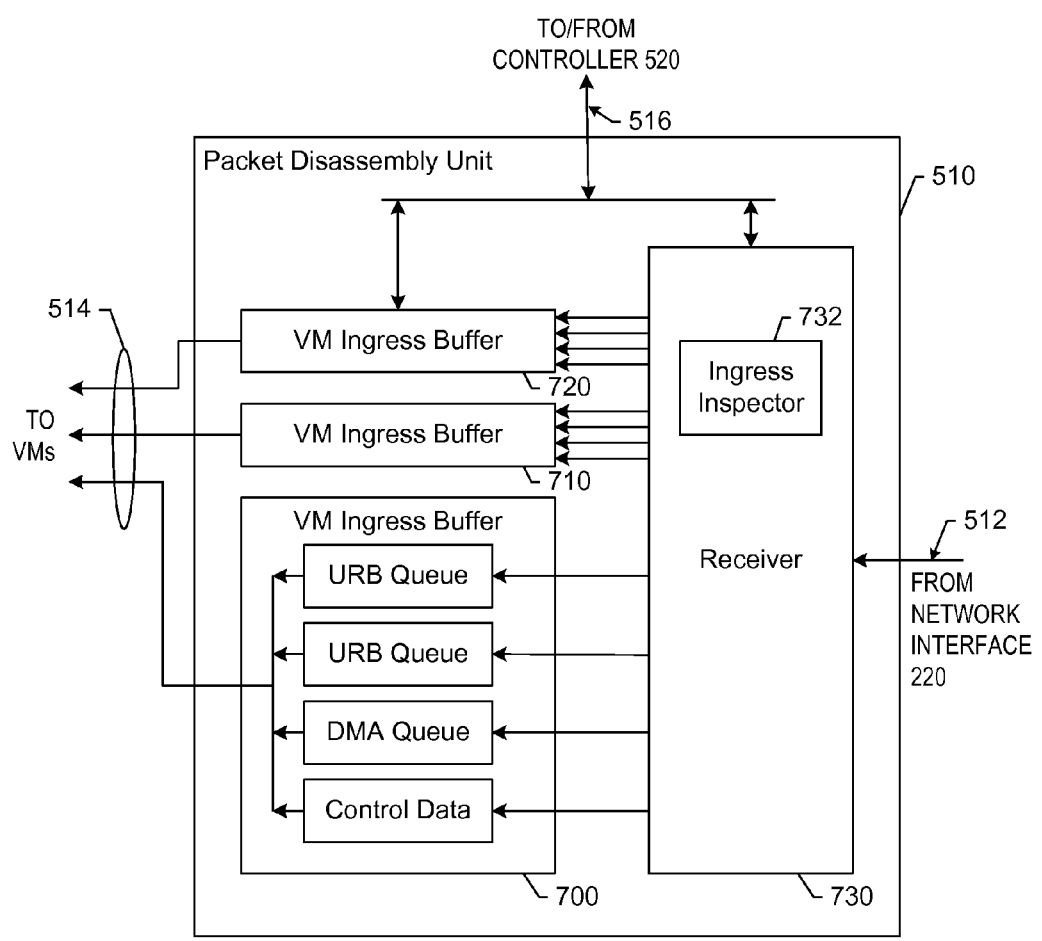
FIG. 7 illustrates an embodiment of a packet disassembly unit.

In an exemplary USB embodiment, PDU 510 receives device-dependent ingress data structures destined for a VM from network interface 220 (FIG. 2) over logical connection 512. PDU 510 then operates in conjunction with analyzer 152 to inspect ingress data (such as inspection of URB header information) to ascertain for device dependent attributes useful for determining process scheduling requirements such as scheduling based on data type, transfer type, size information or identification information. The attributes are forwarded to virtualization manager 160 in FIG. 1 as attributes 172 (also in FIG. 1). PDU 510 separates the ingress packets into logical structures such as URB response and control information and transmits them to the appropriate VM domain using logical signal set 514, for example one logical connection from signal set 514 being associated with each of VMs 180, 182 and 184 in FIG. 4. In some embodiments, PDU 510 enqueues ingress data and schedules transfer to the VM domain or system memory using an ingress transfer schedule. In other embodiments, ingress data such as URB responses are de-multiplexed and data blocks associated with the responses are transmitted separately, for example using DMA resource discussed later. A USB embodiment of PDU 510 is illustrated in FIG. 7.

Figure 6:
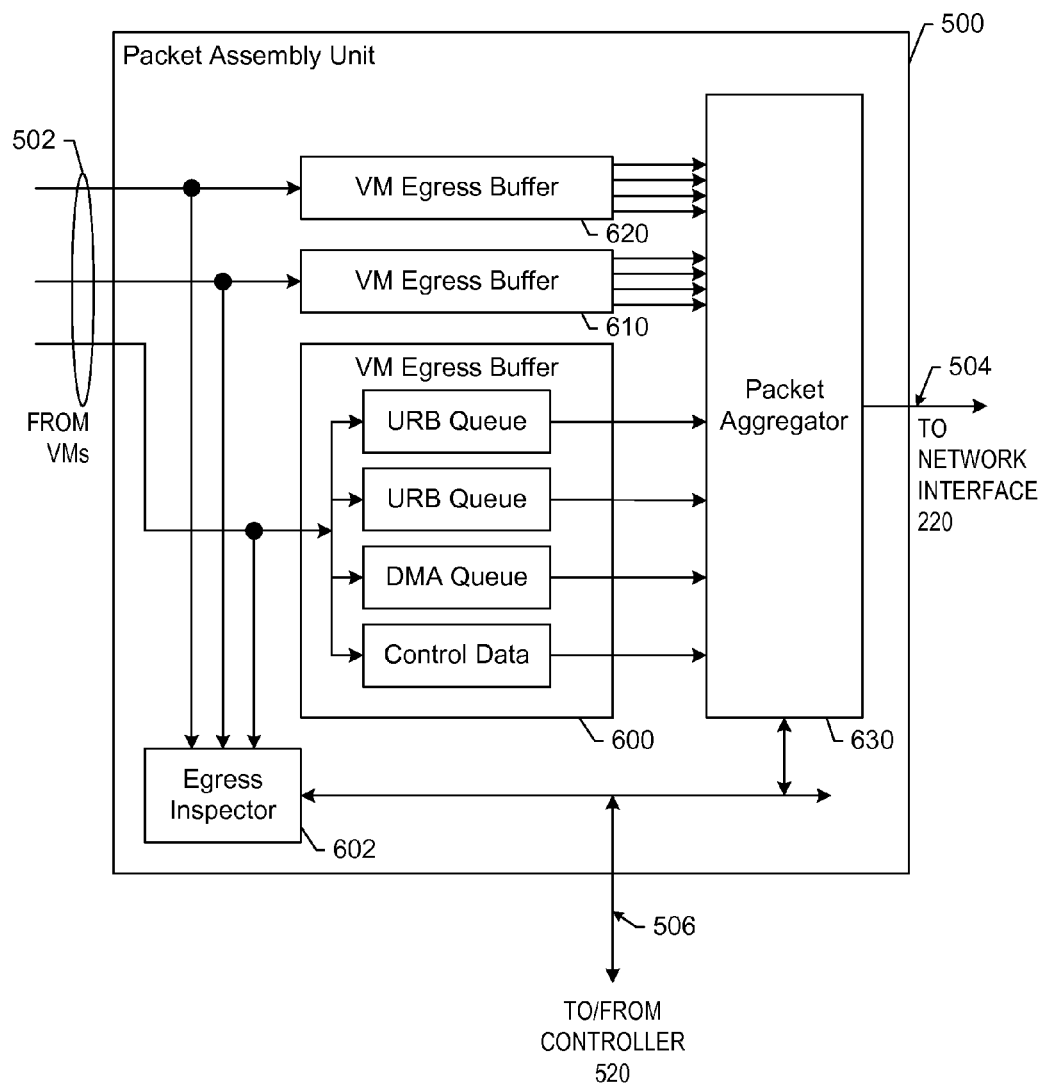
FIG. 6 illustrates an embodiment of a packet assembly unit.

FIG. 6 illustrates an exemplary embodiment of a USB PAU 500 which receives client-bound peripheral device information from the VMs on logical connections 502 and transmits scheduled data structures to the network interface. Egress buffer 600 is a memory area with data queues for each of the egress data types such as one or more URB queues of different transfer schedules as might be determined by an analysis of egress data attributes extracted by egress inspector 602. In some embodiments, buffer 600 also comprises separate DMA data and control data queues associated with a VM such as VM 180, VM 182 or VM 184 in FIG. 1. Egress buffers 610 and 620 are similar memory areas associated with different VMs. In an exemplary embodiment, egress buffers 600, 610 and 620 are assigned to different VMs and are strictly inaccessible by other VMs to maintain the security integrity of the system.

While the example embodiment illustrated in FIG. 6 comprises four queues associated with buffer 600, other embodiments implement a different number of queues. In minimal embodiments, a single queue is used or single queues are associated with each VM. Other embodiments instantiate more data queues according to priorities such as those listed. In a USB embodiment, URBs are queued according to data attributes described. In an embodiment, URB queues maintain comprehensive URB header and data information written by the VM. In other embodiments that support separate DMA data transfers, egress buffer 600 and others maintain pointers or request handles to complete URBs or URB-related data stored elsewhere such as the VM address space. In an embodiment, control data has an independent queue which is maintained at high priority to ensure low latency for control-related transfers. Control data comprises management, security and other information independent of URB structures.

Packet aggregator 630 assembles egress data structures by selecting data from different egress buffers according to a schedule determined by communication scheduler 154 in FIG. 5, assembles packets and submitting ordered data packets comprising one or more URBs and/or control messages to network interface 220 in FIG. 2 over connection 504. In embodiments where URBs or URB-related data is retrieved using DMA resources, packet aggregator 630 is provided address information and data range for the transfer, for example by retrieving request handles from an egress buffer queue or address information in the Memory Descriptor List (MDL) field of the URB header. Data is then retrieved under DMA control and multiplexed with the URB structure as required prior to transmission.

In an embodiment, packet aggregator 630 performs data encryption functions such as AES, DES or the like on client-bound data prior to transmission. In another embodiment, packet aggregator 630 translates URBs from host to client URB format prior to transmission, for example conversion from Linux to Microsoft URB format or vice versa.

FIG. 7 illustrates an exemplary embodiment of a USB PDU 510, comprising receiver 730 which receives VM-bound device dependent data such as URB responses and control information over connection 512 from network interface 220 (ref. FIG. 2) determines VM servicing requirements such as processing priority based on data attributes determined by ingress inspector 732 and assigns the data to ingress queues based on priorities determined by controller 520 in FIG. 5. While the embodiment illustrated in FIG. 7 shows ingress buffer 700 comprising four queues, other embodiments implement fewer or more queues. For example, one minimal embodiment uses no queues and data is transferred directly to VM memory or other system, memory in the domain of virtualization manager 160 in FIG. 1. Other minimal embodiments implement a single queue or a queue associated with each VM. Other embodiments instantiate data queues according to data attributes previously defined. In an embodiment, ingress buffers 710 and 720 are substantially similar to buffer 700. Ingress buffers 700, 710 and 720 comprise independent memory areas assigned to each VM in the system, for example ingress buffer 710 associated with VM 180 in FIG. 1 and ingress buffers 710 and 720 are associated with different VMs in the system.

Receiver 730 submits ingress data to buffer queues according target VM identity and servicing priorities determined by ingress inspector 732 in conjunction with process profiles 554 used by controller 520, both in FIG. 5. In some embodiments such as that illustrated in FIG. 7, ingress buffers further comprises DMA and control data queues. In an embodiment, the DMA queue is used to transfer block data to a memory area separate from the URB response destination. In such an embodiment, the URB MDL field in the URB response header points to the memory address destination of the data associated with the URB response. Then the URB response is queued in an appropriate queue dependent on servicing priorities and the data is queued in the DMA data queue. In an embodiment, control data has an independent queue which is maintained at high priority to ensure low latency for control-related transfers. Control data comprises management, security and other information independent of URB structures.

In embodiments that support DMA operations from PDU 510 to CPU-sub-system 200 (FIG. 2), for example under management of an Input Output Memory Management Unit (IOMMU), traffic manager 150 interrupts the VM with data identity information retrieved from the URB header when a specified queue threshold level is reached, the VM provides a destination address space for the data and the queued data is written to sub-system 200 under DMA control. In virtualized embodiments that prohibit PDU 510 from directly addressing the VM memory address space, controller 520 (FIG. 5) interrupts the target VM and the VM reads the identified queue.

In an embodiment suited to paced DMA, for example VM-bound isochronous audio or video transfers, ingress inspector 732 detects the presence of isochronous data, for example by reading a transfer type from a packet header and a paced DMA transfer is initiated to prevent excessive queue latency and minimize CPU involvement in the isochronous transfers.

In an embodiment, receiver 730 translates URB response information from client to host formats, for example conversion from Linux to Microsoft URB formats or vice versa. In another embodiment, decryption methods are applied before data is queued.

Figure 8:
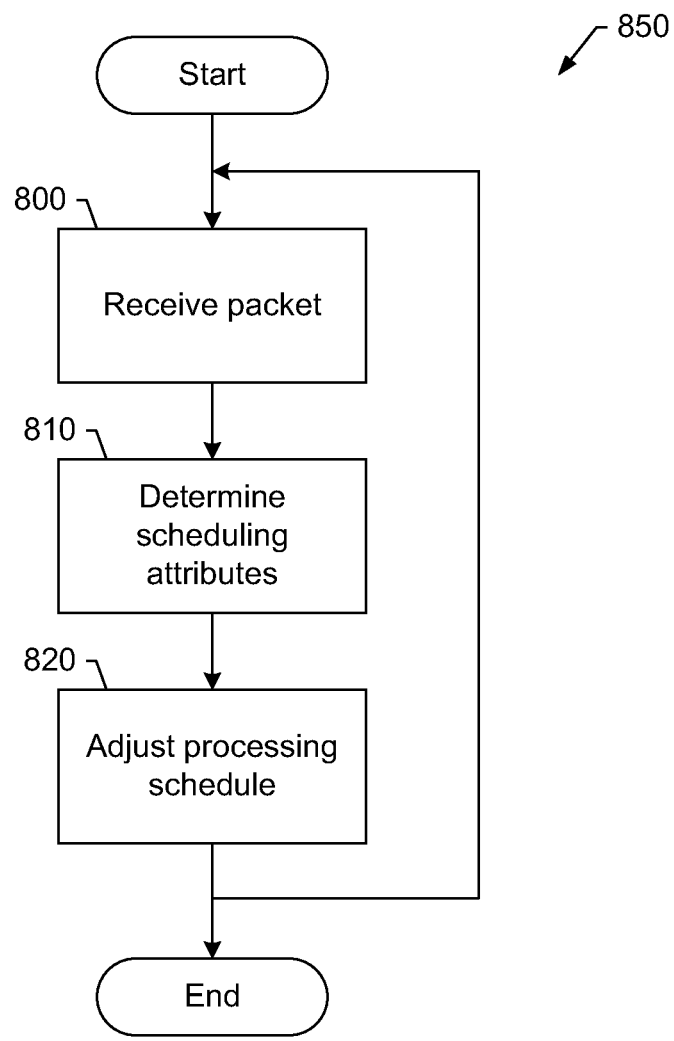
FIG. 8 is a is a flowchart illustrating an embodiment of a method for scheduling processing resources based on ingress queue data attributes.

FIG. 8 is a flowchart illustrating embodiment 850 of a method for scheduling virtual machine processes based on device-dependent peripheral data attributes of ingress packets.

As a first step 800, a packet comprising device communications is received. In an embodiment, the device communications comprises one or more communications-related or device-related attributes such as transfer type, device type, device identification, device event information or data size. An example of a device event is a keyboard press or mouse event associated with an HID device that will benefit from prioritized CPU servicing. In an embodiment, related ingress data is grouped according to related input events such as a "click and hold" window drag event so that the related data can be read as a group and scheduled for batch processing.

As a next step 810, scheduling attributes are determined from the device communications. In an embodiment, traffic manager 150 in FIG. 1 maintains a table that associates different data attributes with different scheduling attributes. For example, in some embodiments a periodic VM schedule is desired if isochronous data is detected in the device communications. As another example, VM priority attention is desired in the presence of HID events. Bulk data may be de-prioritized in some embodiments. In one embodiment, the schedule of a VM associated with low priority data in not adjusted until a delay threshold or buffer fill level is reached. In some embodiments, a time base for ingress communications is provided, either in conjunction with time-stamping of related egress communications or as a method for ensuring that response packets that demand real time servicing can be scheduled accordingly.

As a next step 820, the VM process schedule is adjusted based on the scheduling attributes determined in step 810. In an embodiment, virtualization manager 160 in FIG. 1 evaluates scheduling requirements based on device-dependent attributes, servicing requirements and other virtualization manager criteria. The schedule of one or more VMs is then adjusted accordingly, for example by running a VM immediately, running the VM for a determined duration, running the VM at a determined frequency, delaying the VM until additional data is available for processing or delaying the VM until a pre-determined time limit has been reached. Other virtualization manager criteria include virtual machine resource allocation, other interrupt priorities, file system transfer state, network communication state such as bandwidth availability, the state the other virtual machines, resource usage statistics and the like. In an embodiment, device communications interrupts and other interrupts such as context-switch requests or other I/O requests associated with each VM are grouped and accumulated so that interrupts are processed in batches and VM switching is minimized. In another embodiment, the VM schedule is adjusted according to the number and priority of outstanding interrupt requests so that the context schedule of the VMs is synchronized by queue service request priorities.

In an embodiment, method 850 repeats when a new ingress data packet is available for processing.

Figure 9:
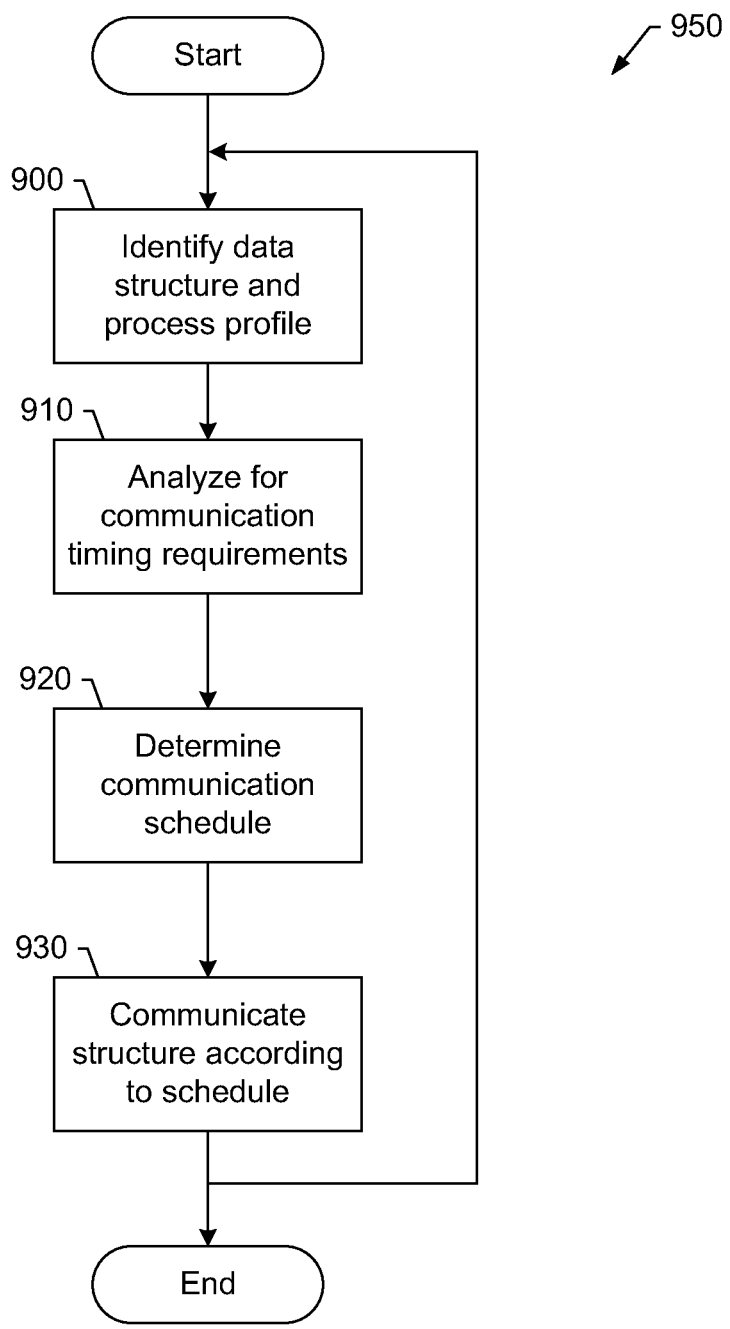
FIG. 9 is a flowchart illustrating an embodiment of a method for scheduling egress data communications based on process profile and egress data attributes.

FIG. 9 is a flowchart illustrating embodiment 950 of a method for scheduling egress peripheral device data communications based on data attributes and process profile information.

As a first step 900, a data structure intended for communication over a computer network to a peripheral device at a remote computer and a process profile associated with the data structure are identified. In an embodiment, one or more data structures intended for communications to a peripheral device are written from the domain of a VM to the traffic manager. Based on the identity of the data structure, for example as stored in an URB header, the traffic manager identifies the profile of the VM, client system and/or peripheral device associated with the data structure.

As a next step 910, the data structure is analyzed for communication timing requirements useful for determining an egress communications schedule for the data structure. In an embodiment, the communications timing requirements are associated with attributes of the data structure such as transfer type, device type, device identification, data size or device event identification previously described. For example in an embodiment, short data sets are aggregated to reduce network packet overheads and large data sets span multiple network packets at a lower priority. In some embodiments, step 910 further comprises receiving network information useful in determining an egress communications schedule. Examples of network information include network bandwidth availability associated with one or more client systems, network bottleneck information that affects multiple clients, error information related to previous transfers or other network statistics such as one-way or round-trip delay information.

As a next step 920, a communication schedule is determined for the data structure based on the communication timing requirements established in step 910 and a process profile associated with the data structure. The process profile identifies data communications priority based on the profile of the client system and/or a device profile associated with the peripheral device. In an embodiment, different client systems have different user profiles, for example as assigned by a system administrator. For example, different client systems may be assigned different network bandwidth allocations, data communications priorities, device accessibility and the like. In an embodiment, different devices are assigned different device profiles. For example communications associated with an HID device has higher priority than communications associated with a mass storage device.

As another example, an audio device with isochronous communications requirements associated with one client system profile has a higher communications priority than an audio device associated with another client system profile. As another example, a default transfer schedule comparable to the USB transfer type priority inherent in USB specifications is established. Another embodiment de-prioritizes bulk or isochronous transfers based on process profiles set by the virtualization manager. Another embodiments tracks bandwidth consumption, for example on a per-client or per-device basis and de-prioritizes high usage connections, for example based on threshold values or network bandwidth availability limitations. In an embodiment that demands periodically scheduled data transfers such as audio data transfers, the traffic manager provides a time base for communications between the VM domains and remote systems, for example using time stamping of egress data structures so that the priority of response packets can be determined and VMs that require periodic servicing can be scheduled accordingly.

As a next step 930, the data structure is communicated to the client system in accordance with the communication schedule determined in step 920. Data structures may be communicated immediately, aggregated with other data structures associated with the same client system or peripheral device or the data structure may be delayed until higher priority communications have completed. As one example, HID responses or control transfers are assigned to high priority queues to minimize latency associated with HID and other high priority events associated with feedback to the user interface. As another example, data associated with bulk transfer types is assigned to a low priority queue and scheduled for transfer according to network bandwidth availability and the status of higher priority queues.

In an embodiment, method 950 repeats when a new egress data structure is available for communication.

Figure 10:
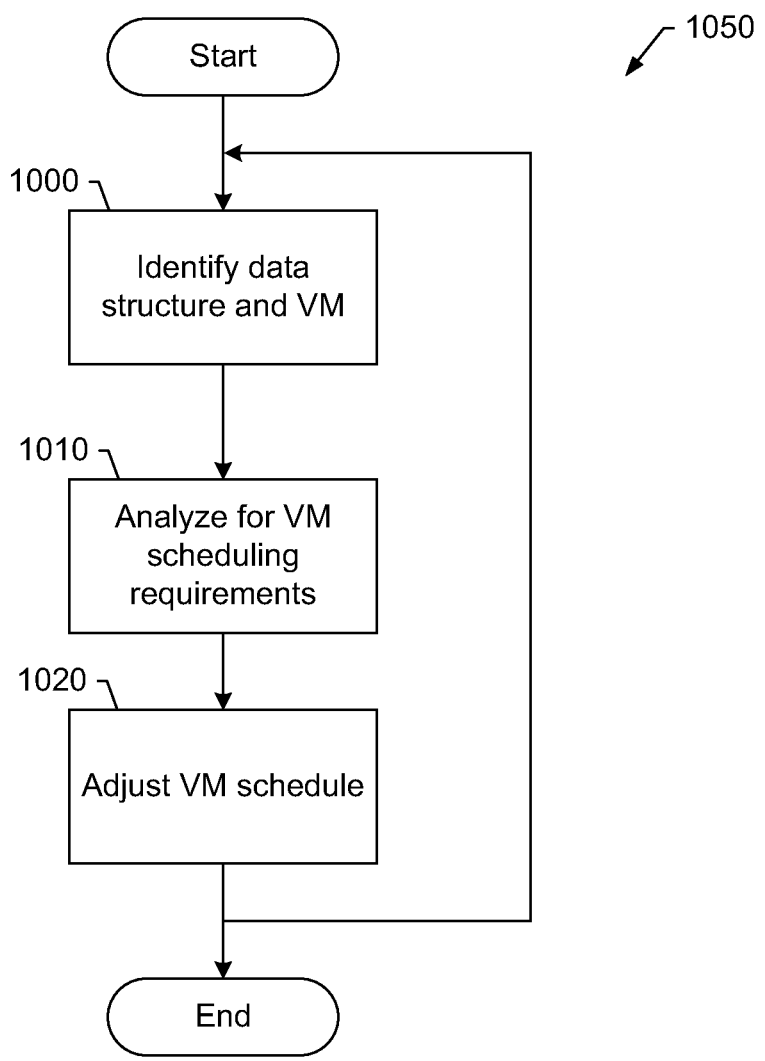
FIG. 10 is a flowchart illustrating an embodiment of a method for scheduling VM execution according to egress data attributes.

FIG. 10 is a flowchart illustrating embodiment 1050 of a method for scheduling virtual machines based on peripheral device data attributes and process profile information associated with egress data structures.

As a first step 1000, a data structure intended for communication over a computer network to a peripheral device at a remote computer and a virtual machine associated with the data structure are identified.

As a next step 1010, the data structure is analyzed for device dependent attributes suitable for providing VM process scheduling requirements useful for determining a VM schedule suited to the attributes of the data structure. For example the attributes of the data structure determine future VM throughput requirements, VM process execution duration, VM process execution frequency and the precise time at which a VM process is initiated and the VM schedule adjusted accordingly. In an embodiment, the VM process scheduling requirements are associated with attributes of the data structure such as transfer type, device type, device identification, data size or device event identification previously described. In another embodiment, VM process scheduling requirements are also associated with the process profile of the virtual machine. The process profile identifies scheduling priority based on the profile of the client system and/or the associated peripheral device.

As a next step 1020, the virtual machine schedule is adjusted according to the VM process scheduling requirements determined in step 1010. In an embodiment, traffic manager 150 in FIG. 1 maintains a table that associates different data attributes with different VM scheduling or servicing requirements. Updated requirements are periodically made available to the virtualization manager (ref attributes and requirements 172 in FIG. 1). The virtualization manager then adjusts the VM processing schedule based in part on device-related VM scheduling requirements received from the traffic manager. As one example, a VM is scheduled for periodic execution when isochronous data or a history of periodic transmissions is identified. As another example, a VM associated with nothing other than egress bulk data traffic is de-prioritized until different data types are identified, for example the presence of ingress data destined for the same VM.

In an embodiment, method 1050 repeats when a new egress data structure is available for communication.

Figure 11:
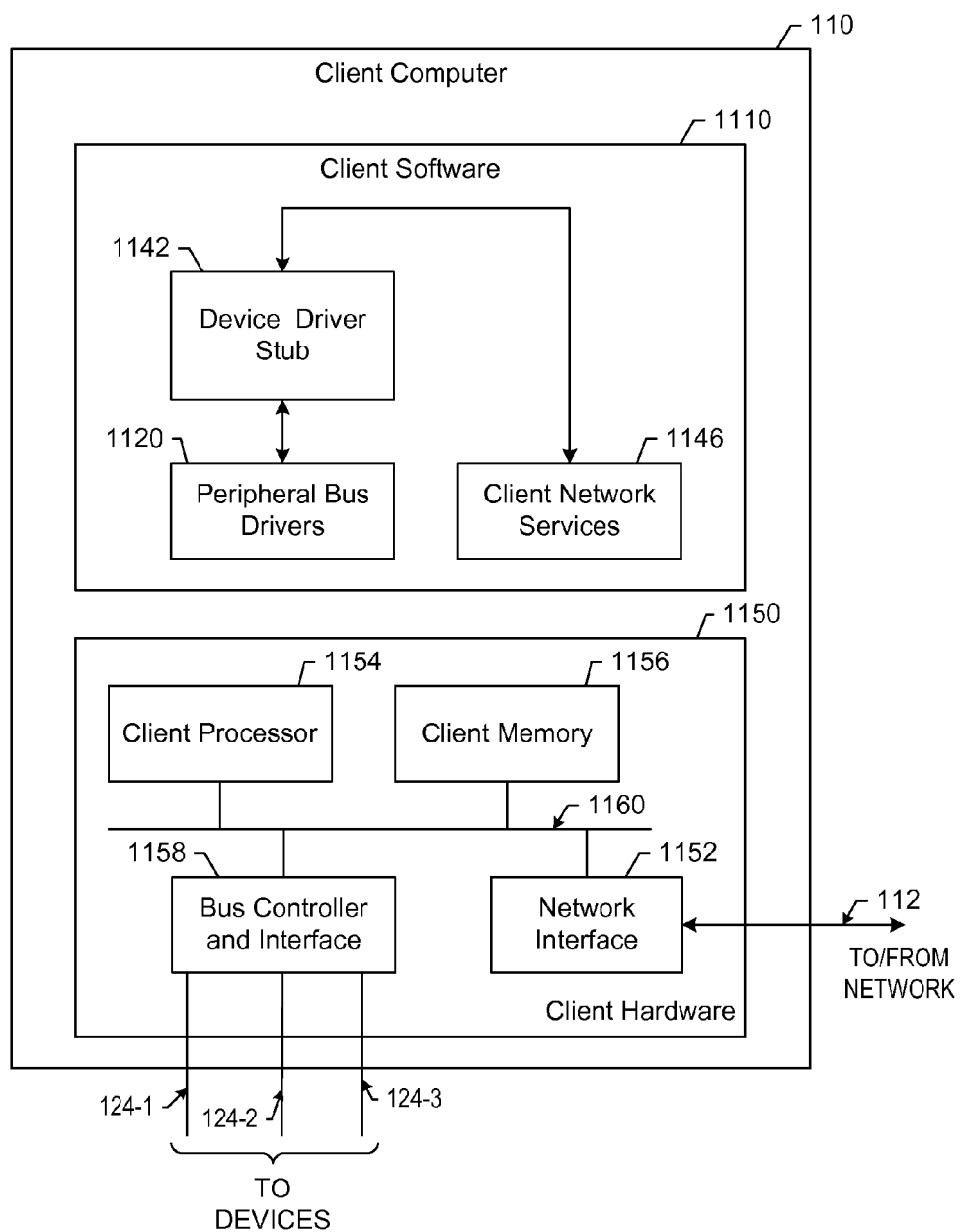
FIG. 11 illustrates an exemplary embodiment of a client computer.

FIG. 11 is an illustration of an exemplary client computer embodiment such as client computer 121 in FIG. 1. Additional details related to client computer apparatus are disclosed in Teradici U.S. patent application Ser. No. 11/694,756 entitled "Selective Routing of Peripheral Device Signals" filed on Mar. 30, 2007, which is incorporated herein by reference in its entirety.

Client computer 121 in FIG. 11 comprises client software 1110 and client hardware 1150. It will be appreciated by those of ordinary skill in the art that in an embodiment such as a thin client or desktop PC, computer 121 also comprises mechanical housing components, connectors, power supplies, and the like not shown in FIG. 11.

Software 1110 comprises peripheral bus drivers 1120, device driver stub 1142 and client network services 1146. In some embodiments, software 1110 further comprises additional elements such as operating system, drivers, application software, connection management services or other services.

Peripheral bus drivers 1120 manage bus controller and interface 1158 described below. Bus drivers 1120 comprise one or more bus driver stacks such as a USB bus driver stack associated with a USB bus controller circuit of interface 1158. In an embodiment, bus drivers 1120 comprise low and high level bus drivers known in the art. Low level drivers provide one or more bus controller interfaces to underlying bus controller circuitry. In one USB embodiment, low-level bus drivers comprise interfaces compliant with Open Host Controller Interface (OHCI) specifications such as OHCI specification revision 1.0a published by Compaq, National and National Semiconductor or Enhanced Host Controller Interface (EHCI) specifications such as EHCI Specification Revision 1.0 published by Intel Corporation. In other embodiments, the low level bus driver interfaces are compliant with Universal Host Controller Interface (UNCI), IEEE1394/Firewire, Wireless Host Controller (WHCI) specifications or a plurality of host controller specifications such as combined OHCI/EHCI compliance. The high level bus driver elements of drivers 1120 typically comprise a Host Controller Driver (HCD) such as the Windows usbport.sys driver, core driver and hub driver associated with the root hub of underlying bus controller circuitry. Host controller drivers, core drivers and hub drivers are known to the art and are specified elsewhere in USB or other peripheral bus documentation.

Device driver stub 1142 provides a protocol for communicating peripheral device information between bus drivers 1120 and device drivers on the host computer such as drivers 402 of VM 180 and others in FIG. 4. In a USB embodiment, stub 1142 receives URB commands from network services 1146, executes the commands and forwards requested data, URB response information (including USB device state information) back to the host computer system (ref computer system 100 in FIG. 1) using network services 1146, using a USB over IP protocol known to the art. In some embodiments, stub 1142 handles URB sequence and return code tracking within client software 1110. In other embodiments, stub 1142 translates URB formats between the format native to client software 1110 and the format used by the host computer system such as translation between Microsoft Windows and Linux formats.

A description of an exemplary method wherein a virtual controller driver such as driver 404 (ref. FIG. 4) in a host computer communicates with stub 1142 to exchange IN or OUT peripheral device information follows. When the virtual controller driver receives an 'URB IN' command (associated with host-bound peripheral device data) from the device drivers (ref. drivers 402 in FIG. 4), the virtual controller driver transmits the URB command across the network to stub 1142, stores the URB to a pending URB queue, and then completes the URB command with a 'STATUS PENDING' response. When stub 1142 receives an 'URB IN' command, it translates the command and forwards it to the bus drivers (ref. bus drivers 1120). Stub 1120 then waits until the requested data transfer is complete and sends the requested data to the virtual controller driver at the host computer. When the virtual controller driver receives the URB IN requested data, it de-queues the URB command from an URB pending queue, copies the requested data into the URB command's data buffer, and completes the URB command with a STATUS SUCCESS response. When the virtual controller driver receives an 'URB OUT' command (associated with client-bound peripheral device information) from the device drivers (ref. drivers 402 in FIG. 4), the virtual controller driver transmits the URB command and associated data across the network to stub 1142, stores the URB to a pending URB queue, and then completes the URB command with a 'STATUS SUCCESS' response. When stub 1142 receives an 'URB OUT' command, it translates the URB command and sends both the URB command and data to the bus drivers. Stub 1142 then waits until the data transfer is complete.

A description of an exemplary method wherein device plug and unplug events are managed by stub 1142 follows. When a device is plugged in, bus drivers 1120 detect the event and signal stub 1142. Stub 1142 acknowledges that a device has been plugged in, retrieves USB descriptors such as device, configuration, interface, HID, endpoint and report descriptor from the bus drivers and transmits a plug in command with USB descriptors to the corresponding virtual controller driver. Upon receiving the plug in command with USB descriptors, the virtual controller driver composes identity information such as hardware ID and compatible ID using the received descriptor. It then informs the PnP manager of the VM that a new device with described identity is plugged in. The PnP manager loads a device driver such as a USB class driver (ref. drivers 402 in FIG. 4) according to the identity information. The device drivers then issues URB commands to the virtual controller driver to initiate and configure the USB device. When a device is unplugged, stub 1142 receives device unplug acknowledgement from the bus drivers. Stub 1142 then sends a device unplug command to the virtual controller drive which releases pending URBs in the URB pending queue and informs the Plug and Play manager that the device has been removed.

Client network services 1146 provide a software interface between driver stub 1142 and hardware network interface 1152. In an embodiment, network services 1146 comprise TCP/IP protocols compatible with network 110 in FIG. 1. In an embodiment, network services 1146 and network interface 1152 implement an encryption capability such as a software or hardware AES, DES or SSL encryption.

In the exemplary embodiment of FIG. 11, client hardware 1150 comprises network interface 1152 for connection 112, client processor 1154, client memory 1156 and bus controller and interface 1158 communicatively coupled by local bus 1160. Bus 1160 is one or more buses such as a Peripheral Component Interface (PCI) bus or other wired connections, as is known in the art. Bus 1160 has additional elements, such as controllers, data buffers, drivers, repeaters, and receivers, to enable communications but omitted from FIG. 11 for clarity. Further, bus 1160 includes address, control, and/or data connections to enable appropriate communications among the aforementioned components. In some embodiments, client hardware further comprises additional elements such as North Bridge, South Bridge, Graphics Processing Unit (GPU), memory controllers, bus bridges and other elements known to the art of computer hardware but omitted from FIG. 11 for clarity.

Interface 1152 is a network interface that provides communicative coupling between computer 121 and network 110 in FIG. 1. Interface 1152 sends and receives electrical, electromagnetic or optical signals which carry digital data streams representing various types of information. In an embodiment, interface 1152 supports a TCP/IP protocol stack for network communications.

Client processor 1154 executes software 1110 and other software such as control and management services related to computer 121. Processor 1154 is a suitable embedded or discrete processor such as a MIPS, ARM, microcontroller, microprocessor or the like. In an embodiment, processor 1154 initializes local bus 1160, interface 1152, memory 1156, interface 1158 and other components present before establishing a management connection with host computer system 100 in FIG. 1 for communication of status updates, error conditions and peripheral device information.

Client memory 1156 comprises any one or combination of volatile computer readable media (e.g., RAM, such as DRAM, SRAM, etc.) and nonvolatile computer readable media (e.g., ROM, hard drive, tape, CDROM, DVDROM, magneto-optical disks, EPROM, EEPROM, Flash EPROM etc.). Moreover, memory 1156 may incorporate electronic, magnetic, optical, and/or other types of storage media. In an embodiment, memory 1156 stores software 1110 and other software executed by client processor 1154.

Bus controller and interface 1158 comprises a bus interface for terminating peripheral bus 124 and others. Interface 1158 further comprises bus controller circuitry such as bus transceivers, PHY circuits, a root hub and industry-compliant host controller such as a UHCI, OHCI, EHCI, WHCI, OHCI/EHCI or IEEE1394/Firewire host controller.

Client computer 121 is described for purposes of example. Embodiments of the invention can be implemented in other computer environments suited to termination of one or more peripheral buses and forwarding of peripheral device signals to a networked host computer system. Furthermore, some embodiments of computer 121 comprise other components such as display, audio or other interfaces and associated processing elements and software.

The several embodiments described herein are solely for the purpose of illustration. Persons skilled in the art will recognize from this description other embodiments may be practiced with modifications and alterations limited only by the claims.

The invention claimed is:

1. A method for communicating media data, comprising:
receiving, by a traffic manager coupled between a plurality of virtual machines (VMs) and an Internet Protocol (IP) network interface, (a) first data from a first VM in the plurality of VMs and en route via a first client computer to a first peripheral device, and (b) second data from a second VM in the plurality of VMs and en route via a second client computer to a second peripheral device;
determining, by the traffic manager, first device dependent attributes of the first data, the first device dependent attributes comprising at least a first device type, a first transfer type information, both related to the first peripheral device, and a first communication requirement for the first data determined by at least the first device type;
determining, by the traffic manager, second device dependent attributes of the second data, the second device dependent attributes comprising at least a second device type, a second transfer type information, both related to the second peripheral device, and a second communication requirement for the second data determined by at least the second device type;
determining, by the traffic manager and based on an available bandwidth of the network interface, a communications schedule associated with a cumulative bandwidth of the first and the second communication requirements;
transmitting, via the IP network interface and according to the communications schedule, the first data, to the first client computer; and
transmitting, via the IP network interface and according to the communications schedule, the second data, to the second client computer, and
wherein the communications schedule is adjusted to delay transmission of the second data responsive to a change in the available bandwidth, when the changed available bandwidth is lower than the cumulative bandwidth of the first and second communication requirements.

2. The method of claim 1 wherein determining the first device dependent attributes comprises extracting the first device dependent attributes from a Universal Serial Bus (USB) Request Block (URB) header of the first data and wherein determining the second device dependent attributes comprises extracting the second device dependent attributes from a URB header of the second data.

3. The method of claim 1, wherein the first peripheral device is a first Universal Serial Bus (USB) peripheral device type coupled to the first client computer and the second peripheral device is a second USB peripheral device type coupled to the second client computer, the first USB peripheral device type identified as requiring a lower latency data transfer than the second USB peripheral device type.

4. The method of claim 1, wherein the communications schedule comprises prioritized transfer of the first data relative to the second data based on identifying the first data as isochronous data and the second data as bulk Universal Serial Bus (USB) transfer data.

5. The method of claim 1, wherein the first communication requirement is based on identifying the first peripheral device as a Human Interface Device (HID) and the second communication requirement is based on identifying the second peripheral device as a mass storage device.

6. The method of claim 1, wherein the first communication requirement is further based on a first client system profile of the first client computer and the second communication requirement is further based on a second client system profile of the second client computer.

7. The method of claim 1, wherein the first device dependent attributes comprise a device identification of the first peripheral device and the second device dependent attributes comprise a device identification of the second peripheral device.

8. The method of claim 1, wherein the first communication requirement is further based on a bandwidth consumption of the first client computer and the second communication requirement is further based on a bandwidth consumption of the second client computer.

9. The method of claim 1, further comprising identifying, by the traffic manager, a third communication requirement for third multi-stage transactional data from a VM in the plurality of VMs; wherein the communications schedule is associated with the cumulative bandwidth including the third communication requirement; and wherein the communications schedule comprises suspending transmitting the second data until completing a transmission of the third multi-stage transactional data.

10. The method of claim 9, wherein suspending transmitting the second data occurs prior to receiving, by the traffic manager, all of the third multi-stage transactional data based on the traffic manager maintaining multi-stage state information associated with the third communication requirement.

11. The method of claim 1, further comprising identifying, by the traffic manager, a third communication requirement for third control data from a VM in the plurality of VMs, the communications schedule associated with the cumulative bandwidth including the third communication requirement; and wherein the communications schedule comprises transmitting the third control data prior to transmitting any non-control peripheral device data.

12. The method of claim 11, wherein the third control data comprises one of management data or security data independent of USB data.

13. The method of claim 11, wherein the communications schedule is adjusted to delay at least one of the first data or the second data responsive to a change in the available bandwidth, the changed available bandwidth lower than the cumulative bandwidth including the first, the second and the third communication requirements.

14. The method of claim 1, wherein transmitting the first data to the first client computer according to the communication schedule comprises one of i) communicating the first data immediately, ii) aggregating the first data with third data from the first VM, the third data associated with the first peripheral device, or iii) aggregating the first data with fourth data from the first VM, the fourth data associated with the first client computer.

15. The method of claim 1, wherein the traffic manager comprises one of (i) software functions executed by a central processing unit (CPU) or (ii) an independent logic circuit implemented as one of (A) a field-programmable gate array (FPGA) or (B) an application-specific integrated circuit (ASIC).

16. The method of claim 1, wherein determining the communication schedule further comprises applying backpressure to at least one of a first device driver associated with the first peripheral device or a second device driver associated with the second peripheral device.

17. The method of claim 1, wherein determining the communication schedule further comprises queuing a transfer request associated with the second data according to a transfer priority objective.

18. The method of claim 1, wherein determining the communication schedule further comprises queuing a transfer request associated with the second data according to the second device dependent attributes of a Universal Serial Bus (USB) transfer type, the USB transfer type comprising one of isochronous, bulk or control transfer types.

19. The method of claim 1, wherein each VM of the plurality of VMs comprises an isolated user environment operating on a host computer.

20. The method of claim 1, wherein the traffic manager receives the first data before the second data and determining the communication schedule comprises delaying transmitting the first data until after transmitting the second data.

* * * * *